United States Patent
Yu et al.

(10) Patent No.: US 10,630,900 B2
(45) Date of Patent: Apr. 21, 2020

(54) SWITCHING BETWEEN OPERATION MODES OF VIDEO SURVEILLANCE DEVICE

(71) Applicant: ZHEJIANG UNIVIEW TECHNOLOGIES CO., LTD, Hangzhou (CN)

(72) Inventors: Hengle Yu, Hangzhou (CN); Qiong Xu, Hangzhou (CN); Xiaolei Chen, Hangzhou (CN)

(73) Assignee: Zhejiang Uniview Technologies Co., Ltd., Hangzhou (CN)

( * ) Notice: Subject to any disclaimer, the term of this patent is extended or adjusted under 35 U.S.C. 154(b) by 0 days.

(21) Appl. No.: 15/774,974

(22) PCT Filed: Aug. 30, 2016

(86) PCT No.: PCT/CN2016/097409
§ 371 (c)(1),
(2) Date: May 9, 2018

(87) PCT Pub. No.: WO2017/092445
PCT Pub. Date: Jun. 8, 2017

(65) Prior Publication Data
US 2018/0376063 A1 Dec. 27, 2018

(30) Foreign Application Priority Data
Dec. 3, 2015 (CN) .......................... 2015 1 0881516

(51) Int. Cl.
*H04N 5/232* (2006.01)
*H04N 5/235* (2006.01)
(Continued)

(52) U.S. Cl.
CPC ......... *H04N 5/23245* (2013.01); *H04N 5/232* (2013.01); *H04N 5/235* (2013.01);
(Continued)

(58) Field of Classification Search
CPC ...... H04N 9/04; H04N 5/23245; H04N 5/232; H04N 5/235; H04N 5/2351; H04N 5/2353;
(Continued)

(56) References Cited

U.S. PATENT DOCUMENTS 8,264,437 B2 * 9/2012 Nitanda ............... G09G 3/2003
345/102
8,305,447 B1 * 11/2012 Wong ............... G08B 13/19602
348/151
(Continued)

FOREIGN PATENT DOCUMENTS

CN 201127061 Y 10/2008
CN 101893804 A 11/2010
(Continued)

OTHER PUBLICATIONS

ISA State Intellectual Property Office of the People's Republic of China, International Search Report Issued in Application No. PCT/CN2016/097409, dated Dec. 5, 2016, WIPO, 4 pages.
(Continued)

*Primary Examiner* — Thai Q Tran
*Assistant Examiner* — Sunghyoun Park
(74) *Attorney, Agent, or Firm* — McCoy Russell LLP

(57) ABSTRACT

Disclosed are a method and device for switching between operation modes. The method includes: reading a current operation mode of a surveillance device, and recording an exposure parameter of the current operation mode; and when a switch between operation modes is to be performed, setting a target exposure value of a target operation mode to which the current operation mode is to be switched to, and calculating an exposure parameter of the target operation mode in combination with the exposure parameter of the current operation mode. The device includes: a recording
(Continued)

module; a detection module; and a switching module. The method and device of the disclosure directly estimate the exposure parameter of the target operation mode according to the exposure parameter of the current operation mode without gradually adjusting the exposure parameter by metering and exposure calculation, thereby significantly increasing a switching speed.

20 Claims, 2 Drawing Sheets

(51) Int. Cl.
  *H04N 5/243* (2006.01)
  *H04N 9/04* (2006.01)
  *G06T 7/50* (2017.01)
  *G06T 7/20* (2017.01)
(52) U.S. Cl.
  CPC ......... *H04N 5/2351* (2013.01); *H04N 5/2353* (2013.01); *H04N 5/243* (2013.01); *H04N 9/04* (2013.01); *G06T 7/20* (2013.01); *G06T 7/50* (2017.01); *G06T 2207/10016* (2013.01); *G06T 2207/10048* (2013.01); *G06T 2207/30232* (2013.01)
(58) Field of Classification Search
  CPC . H04N 5/243; G06T 7/20; G06T 2207/10016; G06T 2207/10048; G06T 2207/30232; G06T 7/50
  See application file for complete search history.

(56) References Cited

U.S. PATENT DOCUMENTS

| | | | |
|---|---|---|---|
| 9,813,630 B1* | 11/2017 | Linzer | H04N 5/23254 |
| 2002/0152557 A1* | 10/2002 | Elberbaum | H04N 5/2253 8/405 |
| 2003/0007076 A1 | 1/2003 | Okisu et al. | |
| 2003/0081954 A1* | 5/2003 | Niikawa | H04N 1/603 396/429 |
| 2003/0093805 A1* | 5/2003 | Gin | G08B 13/19619 725/105 |
| 2005/0141117 A1* | 6/2005 | Kim | G02B 26/007 359/892 |
| 2005/0162542 A1 | 7/2005 | Nakayama | |
| 2006/0171704 A1* | 8/2006 | Bingle | B60R 11/04 396/419 |
| 2009/0160968 A1 | 6/2009 | Prentice et al. | |

FOREIGN PATENT DOCUMENTS

| | | |
|---|---|---|
| CN | 102724404 A | 10/2012 |
| CN | 103533252 A | 1/2014 |
| CN | 103702038 A | 4/2014 |
| CN | 105491285 A | 4/2016 |

OTHER PUBLICATIONS

European Patent Office, Extended European Search Report Issued in Application No. 16869756.3, dated Oct. 5, 2018, Germany, 8 pages.

* cited by examiner

SWITCHING BETWEEN OPERATION MODES OF VIDEO SURVEILLANCE DEVICE

CROSS-REFERENCE TO RELATED APPLICATIONS

The present application is a U.S. National Phase of International Patent Application Ser. No. PCT/CN2016/097409 entitled "METHOD AND DEVICE FOR SWITCHING BETWEEN OPERATION MODES OF VIDEO MONITORING APPARATUS," filed on Aug. 30, 2016. International Patent Application Ser. No. PCT/CN2016/097409 claims priority to Chinese Patent Application No. 201510881516.6, filed on Dec. 3, 2015. The entire contents of each of the above-cited applications are hereby incorporated by reference in their entirety for all purposes.

TECHNICAL FIELD

The present disclosure relates to the technical field of a video surveillance device and particularly relates to switching between operation modes of a video surveillance device.

BACKGROUND

Video monitoring, which is an important part of a security protection system, has been widely used in many occasions because of its visuality, accuracy, promptness and richness in information contents. In recent years, with the rapid development of computers, networks and image processing and transmission technologies, the trend of popularization of video monitoring is becoming more and more apparent.

Passive Infrared (PIR) technology can be applied to a video surveillance device, and a video surveillance device using the PIR technology is called a PIR camera. In an environment of low illumination, a PIR camera may switch to a black/white mode and automatically turn on an infrared lamp. When a motion detection mechanism or a PIR detector of the PIR camera detects that a monitored target is in a distance from the camera within a particular range, the PIR camera may automatically switch to a color mode to take a photograph or record a video.

After switching to the color mode, the PIR camera needs to re-perform an exposure calculation. When the exposure calculation is re-performed, an exposure parameter may be adjusted from the right end or some special point of an exposure line as a starting point. The exposure line refers to a sequence in which exposure elements such as shutter speed, aperture, gain and the like are adjusted during an exposure adjustment. As shown in FIG. 1, a point Pa corresponds to an exposure parameter that should be used in a color mode, and the exposure parameter may be adjusted by starting from the right end or a special point Pb of the exposure line to gradually approximate to the point Pa through light metering and exposure calculation. However, because the light metering and the exposure calculation may take time, a monitored target may leave a monitoring range before the exposure calculation is completed, resulting in that the monitored target cannot be captured a color image in time.

Therefore, it is pretty important to estimate an exposure parameter to be used before a PIR camera switches to a color mode.

SUMMARY

The purpose of this disclosure is to provide a method and a device for switching between operation modes of a video surveillance device, which can prevent the problem of incapable of capturing a scene to be recorded in time caused by recalculation of exposure parameters of the video surveillance device, and can adjust exposure parameters rapidly.

To achieve the above purpose, one aspect of this disclosure provides a method of switching between operation modes of a video surveillance device, the method comprising: reading a current operation mode of the video surveillance device and recording an exposure parameter of the current operation mode; and in case that a switch between operation modes is to be performed, setting a target exposure value of a target operation mode to be switched to, and calculating an exposure parameter of the target operation mode according to the target exposure value in combination with the exposure parameter of the current operation mode.

For the above method, according to an example, the operation modes comprise a black/white mode and a color mode.

For the above method, according to an example, the method further comprises: determining whether the switch between the operation modes is to be performed according to the current operation mode and an amount of ambient illumination.

For the above method, according to an example, determining whether the switch between the operation modes is to be performed according to the current operation mode and the amount of ambient illumination comprises: in the case that the current operation mode is the black/white mode, determining that the current operation mode is to be switched to the color mode when the amount of ambient illumination is above a particular threshold; and in the case that the current operation mode is the color mode, determining that the current operation mode is to be switched to the black/white mode when the amount of ambient illumination is below a particular threshold.

For the above method, according to an example, the method further comprises: determining whether the switch between the operation modes is to be performed according to a distance between a monitored target and the video surveillance device.

For the above method, according to an example, determining whether the switch between the operation modes is to be performed according to the distance between the monitored target and the video surveillance device comprises: detecting the distance between the monitored target and the video surveillance device through a motion detection or a Passive Infrared (PIR) detection; and determining that the current operation mode is to be switched to the color mode when the detected distance is within a particular range.

For the above method, according to an example, setting the target exposure value of the target operation mode to be switched to, and calculating the exposure parameter of the target operation mode according to the target exposure value in combination with the exposure parameter of the current operation mode, comprise: calculating the exposure parameter of the target operation mode according to the following formula:

$$G1*S1 = \frac{G2*S2*R2*P2*K2*T1}{R1*P1*K1*T2}$$

T2 is the exposure value of the current operation mode, G2 is a gain of the current operation mode, S2 is a shutter speed of the current operation mode, R2 is an aperture of the current operation mode, P2 is power of a white light compensator in the current operation mode, K2 is a transmittance of a light filter in the current operation mode, T1 is a target exposure value of the target operation mode, G1 is a gain of the target operation mode, S1 is a shutter speed of the target operation mode, R1 is an aperture of the target operation mode, P1 is power of the white light compensator in the target operation mode, and K1 is a transmittance of the light filter in the target operation mode.

For the above method, according to an example, the method further comprises: setting the shutter speed S1 of the target operation mode to one in a frame rate of the video surveillance device, and adjusting the gain of the video surveillance device according to the calculated gain G1 of the target operation mode. In case that the shutter speed S1 of the target operation mode is set, the gain of the video surveillance device can be adjusted directly to achieve a rapid switch.

According to the method of switching between operation modes of the video surveillance device, the exposure parameter of the target operation mode can be estimated based on the exposure parameter of the current operation mode without light metering and adjusting it gradually based on the exposure line, thus, the switch speed can be improved to take a photograph or record a video in time when a monitored target is detected to enter a range.

DETAILED DESCRIPTION OF THE EMBODIMENTS

Further detailed description will be made below to technical solutions of the present disclosure in combination with the accompanying drawings and examples, and these examples are not limiting of the present disclosure.

According to an example, there is provided a method of switching between operation modes of a video surveillance device, which is applicable to a video surveillance device such as a PR camera. Taking a PIR camera for example, the PIR camera may switch an operation mode when detecting a change in amount of illumination or that a monitored target is in a distance away from the camera within a particular range. The method may estimate an exposure parameter of a target operation mode to be switched to according to the exposure parameter of a current operation mode, thereby achieving a purpose of adjusting an exposure parameter rapidly.

Figure 1:
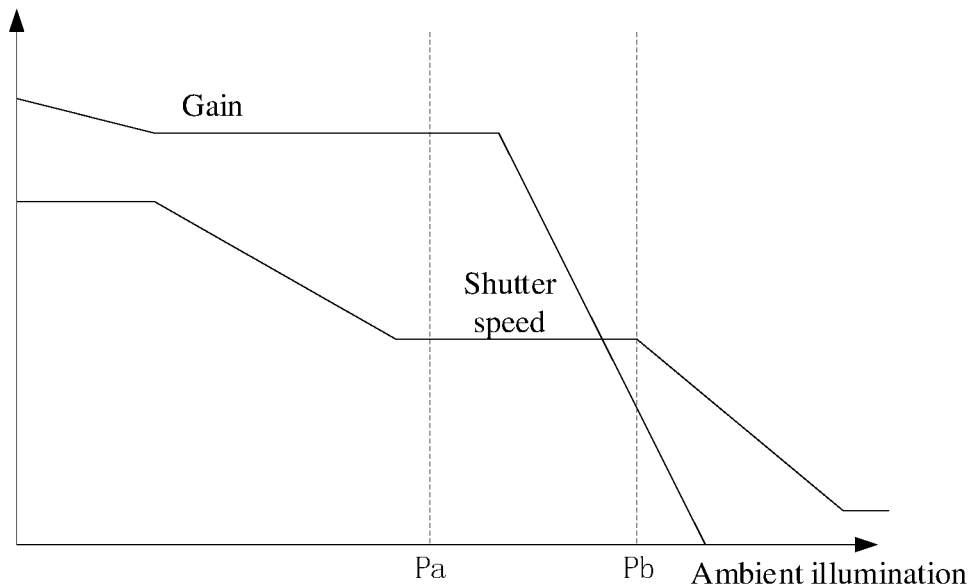
FIG. 1 is a schematic diagram illustrating adjusting an exposure parameter.
Figure 2:
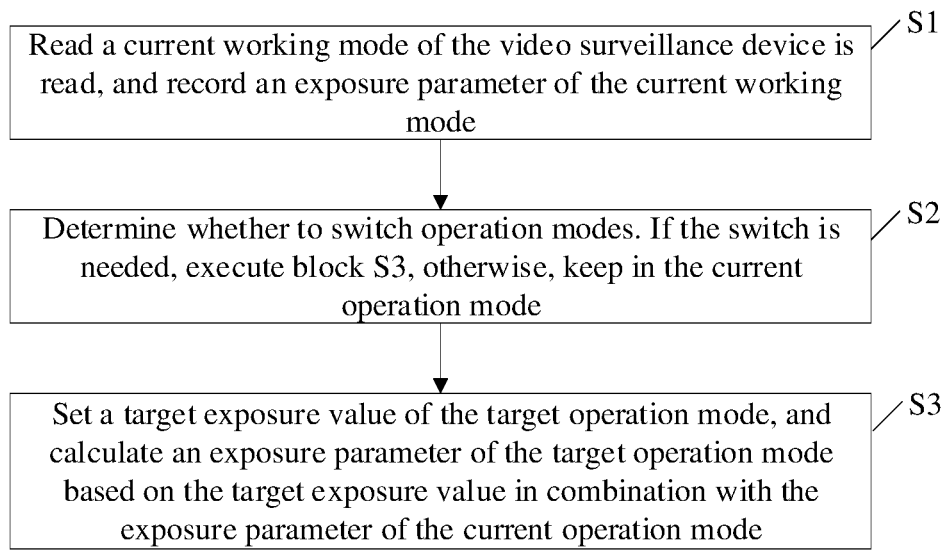
FIG. 2 is a flow chart schematically illustrating a method of switching between operation modes of a video surveillance device according to the present disclosure.

As shown in FIG. 2, a method of switching between operation modes of a video surveillance device according to the example may include blocks S1-S3.

At block S1: a current operation mode of the video surveillance device may be read, and an exposure parameter of the current operation mode may be recorded.

Still taking a PR camera as an example, operation modes of the PIR camera may include a black/white mode and a color mode. Generally, the PIR camera may switch to the black/white mode when an amount of ambient illumination is below a particular threshold and to the color mode when the amount of ambient illumination is above the particular threshold. The black/white mode is adaptive for night use, and in the black/white mode, the PR camera may turn off a white-light lamp and turn on an infrared lamp to collect a black/white video image to guarantee an image effect. The color mode is used for daytime, and in the color mode, the camera may turn off the infrared lamp and turn on the white-light lamp to collect a color video to guarantee an image effect.

Meanwhile, when the camera works in the black/white mode, if the camera detects that a monitored target is in a distance away from the camera within a particular range, the camera may automatically switch to the color mode to take a photograph or record a video to obtain a color video image of the monitored target. Moreover, the camera may switch back to the black/white mode after the monitored target leaves the range.

Thus, the video surveillance device may perform switching between different operation modes. The video surveillance device may automatically switch from the black/white mode to the color mode when detecting that a monitored target is in a distance away from the camera within a particular range. At this time, if the exposure parameter is adjusted rapidly, it can be guaranteed that a color image of the monitored target may be taken in time. In the example, the exposure parameter of a target operation mode may be estimated according to those of a current operation mode, and then switching may be performed directly using the estimated exposure parameters without need for light metering and gradual adjustment.

At block S2: it may be determined whether the switching of the operation mode is to be performed. If the switching is to be performed, block S3 may be executed, otherwise, the video surveillance device may continue to work in the current operation mode.

In an example, whether to perform switching between operation modes of the video surveillance device may be determined according to an amount of ambient illumination, where the video surveillance device may switch to the black/white mode when the amount of ambient illumination is below a particular threshold and to the color mode when the amount of ambient illumination is above the particular threshold.

In another example, whether to perform switching between operation modes of the video surveillance device may be determined by determining a distance between the monitored target and the camera. A method of determining the distance may include a motion detection method or a PIR detection method. The video surveillance device may automatically switch to the color mode when the distance between a monitored target and the camera is determined to be within a particular range and switch back to the previous operation mode according to the amount of illumination after the monitored target leaves the range.

At block S3: a target exposure value of the target operation mode may be set, the exposure parameter of the target operation mode may be calculated according to the target exposure value in combination with the exposure parameter of the current operation mode, and the current operation mode of the video surveillance device may be then switched to the target operation mode according to the calculated exposure parameter.

In the example, when it is determined at block S2 that switching of the operation mode of the video surveillance device is to be performed, the exposure parameter of the target operation mode may be calculated according to those of the current operation mode.

For example, the exposure parameter of the current operation mode may include: an exposure value, a gain, a shutter speed, an aperture, power of a light compensator and transmittance of a light filter. The exposure parameter of the target operation mode may be calculated by setting a target exposure value of the target operation mode.

The process of the calculation is as follows:

Assume in the color mode, the target exposure value is T1, the gain is G1, the shutter speed is S1, the aperture is R1, the power of a white light compensator is P1, and the transmittance of a light filter is K1.

Assume in the black/white mode, the target exposure value is T2, the gain is G2, the shutter speed is S2, the aperture is R2, the power of the white light compensator is P2, and the transmittance of the light filter is K2.

According to the exposure equivalence principle, there are two following formulas:

$$T1=\lambda*G1*S1*R1*P1*K1 \quad (1)$$

$$T2=\lambda*G2*S2*R2*P2*K2 \quad (2)$$

where $\lambda$ is a constant.

When the black/white mode is switched to the color mode, T1, T2, R1, P1, K1, G2, S2, R2, P2 and K2 are known, while G1 and S1 are unknown.

Since T1 and T2 are not 0, the following formula can be obtained from formulas (1) and (2):

$$G1*S1 = \frac{G2*S2*R2*P2*K2*T1}{R1*P1*K1*T2}.$$

Thus, G1 may be calculated by setting S1, or S1 may be calculated by setting G1. The current operation mode of the video surveillance device may be switched to the target operation mode according to the exposure parameter obtained by calculation. For example, when being switched to the color mode, the PIR camera may turn off an infrared lamp and turn on a white-light lamp to perform exposure with the calculated exposure parameter of the color mode, thereby taking a photograph or recording a video.

In the example, the shutter speed S1 of the target operation mode may be set to one in a frame rate of the camera. If the frame rate of the camera is f, S1=1/f. The gain of the PIR camera may be adjusted according to the calculated gain G1 of the target operation mode, thereby completing switching.

Likewise, when the color mode is switched to the black/white mode, a calculation may be performed based on the same principle, which is not redundantly described herein.

It should be noted that exposure parameters of different video surveillance devices are different. For example, some devices are not provided with light compensators. In this case, the power of the light compensator is not included in formulas of the exposure equivalence principle for these devices. That is, items of specific parameters included in the formulas used for calculating the exposure parameter herein may be increased or decreased without causing any influence to the technical effect of the present disclosure.

It can be seen that the exposure parameter of the target operation mode may be calculated based on the above formulas as long as the target exposure value of the target operation mode is preset, regardless of the fact that the black/white mode is switched to the color mode or the color mode is switched to the black/white mode.

It can be readily appreciated that in the example, when switching of operation modes is performed, the exposure parameter of the target operation mode can be directly calculated according to those of the current operation mode, without a need to gradually adjust them through light metering and exposure calculation based on an exposure line, thus, the speed of switching may be improved to take a photograph or record a video in time when a monitored target is detected to enter a range.

In the above examples, a method of switching between operation modes of a video surveillance device according to an example of the present disclosure is described by taking a PIR camera as an example. However, the method is not limited to the PR camera and may also be applied to other optical imaging devices.

Figure 3:
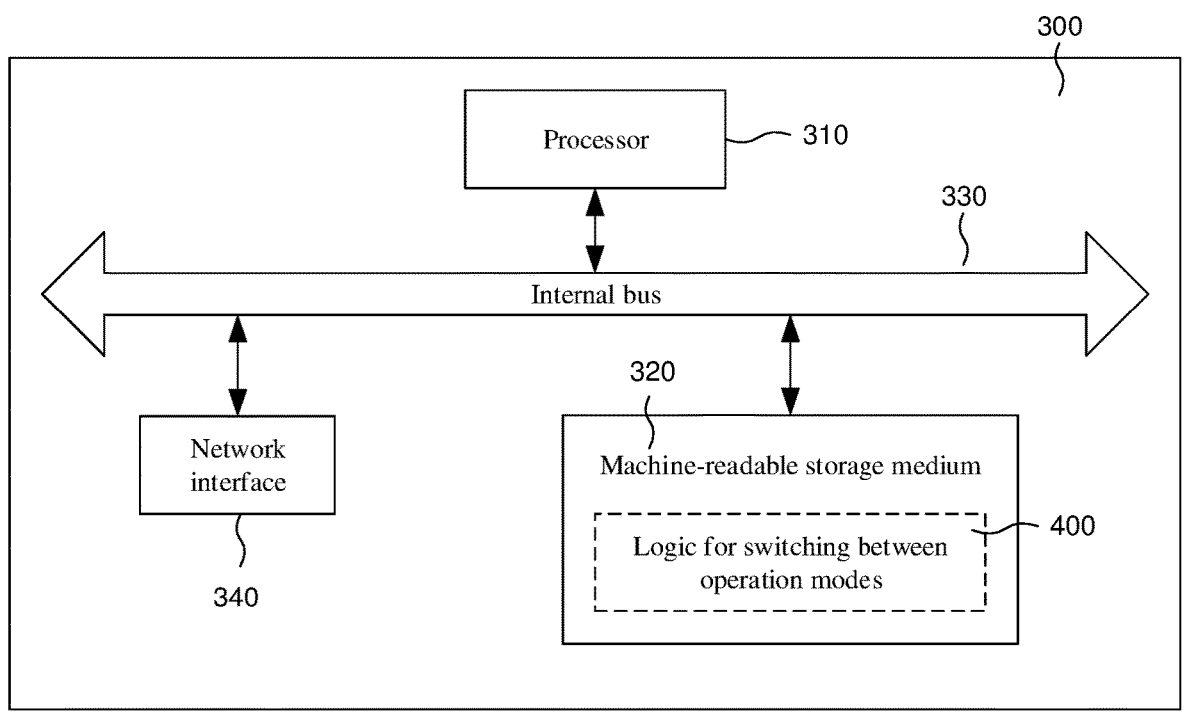
FIG. 3 is a schematic diagram illustrating a hardware structure of a device for switching between operation modes according to the present disclosure.
Figure 4:
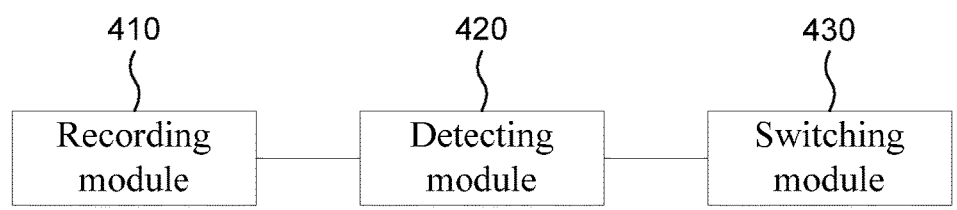
FIG. 4 is a schematic diagram illustrating function modules of a logic for switching between operation modes corresponding to the switching method shown in FIG. 2.

The present disclosure may provide a device for switching between operation modes of a video surveillance device. As shown in FIG. 3, the switching device 300 may include a processor 310 and a machine-readable storage medium 320, where the processor 310 and the machine-readable storage medium 320 may be connected with each other via an internal bus 330. In other possible implementations, the switching device 300 may further include an external interface 340 for communicating with other device or component.

In different examples, the machine-readable storage medium 320 may be: a Random Access Memory (RAM), a volatile memory, a nonvolatile memory, a flash memory, a memory drive (e.g. a hard disk drive), a solid-state hard disk, any type of storage disks (e.g. a compact disk, a DVD or the like), or a similar storage medium, or a combination thereof.

Further, machine-executable instructions corresponding to a logic 400 for switching between operation modes are stored on the machine-readable storage medium 320. The logic 400 for switching between the operation modes may functionally include the following modules:

a recording module 410 configured to read a current operation mode of a video surveillance device and record an exposure parameter of the current operation mode;

a detecting module 420 configured to determine whether to switch between operation modes according to the current operation mode and an amount of ambient illumination or according to a distance between a monitored target and the video surveillance device; and a switching module 430 configured to set a target exposure value of a target operation mode to be switched to and calculate an exposure parameter of the target operation mode according to the target exposure value in combination with the exposure parameter of the current operation mode in case that the operation mode is to be switched.

According to an example, the operation mode may include a black/white mode and a color mode.

According to an example, the detecting module 420 is configured to perform the following operations when whether to switch operation modes is determined according to the current operation mode and the amount of ambient illumination:

determining that the current operation mode is to be switched to the color mode when the amount of ambient illumination is above a particular threshold in the case that the current operation mode is the black/white mode; and determining that the current operation mode is to be switched to the black/white mode when the amount of ambient illumination is below a particular threshold in the case that the current operation mode is the color mode.

According to an example, the detecting module 420 is configured to perform the following operations when whether to switch operation modes is determined according to the distance between the monitored target and the video surveillance device:
detecting the distance between the monitored target and the video surveillance device through a motion detection or a PIR detection; and
determining that the current operation is to be switched to the color mode when the detected distance is within a particular range.

According to an example, the switching module 430 is configured to perform the following operations:
calculating the exposure parameter of the target operation mode according to the following formula:

$$G1 * S1 = \frac{G2 * S2 * R2 * P2 * K2 * T1}{R1 * P1 * K1 * T2}$$

where T2 is the exposure value of the current operation mode, G2 is the gain of the current operation mode, S2 is the shutter speed of the current operation mode, R2 is the aperture of the current operation mode, P2 is the power of a white light compensator in the current operation mode, K2 is the transmittance of a light filter in the current operation mode, T1 is the target exposure value of the target operation mode, G1 is the gain of the target operation mode, S1 is the shutter speed of the target operation mode, R1 is the aperture of the target operation mode, P1 is the power of the white light compensator in the target operation mode, and K1 is the transmittance of the light filter in the target operation mode.

According to an example, the switching module 430 is further configured to perform the following operations:
setting the shutter speed S1 of the target operation mode to one in a frame-rate of the video surveillance device, and adjusting the gain of the video surveillance device according to the calculated gain G1 of the target operation mode.

The process that the switching device 300 executes the logic 400 for switching between operation modes is further described below by taking implementation of software as an example. In the example, the logic 400 for switching between operation modes in the present disclosure may be understood as machine-executable instructions stored on the machine-readable storage medium 320. When executing the logic 400 for switching between operation modes, the processor 310 of the switching device 300 disclosed herein may execute the following operations by invoking the machine-executable instructions corresponding to the logic 400 for switching between operation modes and stored on the machine-readable storage medium 320: reading the current operation mode of the video surveillance device, and record the exposure parameter of the current operation mode; and setting the target exposure value of the target operation mode to be switched to and calculating the exposure parameter of the target operation mode according to the target exposure value in combination with the exposure parameter of the current operation mode in the case that the operation mode is to be switched.

According to an example, the operation mode may include a black/white mode and a color mode.

According to an example, the machine-executable instructions may also cause the processor to:
determine whether to switch between operation modes according to the current operation mode and the amount of ambient illumination.

According to an example, when determining whether to switch between operation modes according to the current operation mode and the amount of ambient illumination, the machine-executable instructions may cause the processor to:
determine that the current operation mode is to be switched to the color mode when the amount of ambient illumination is above a particular threshold in the case that the current operation mode is the black/white mode; and determine that the current operation mode is to be switched to the black/white mode when the amount of ambient illumination is below a particular threshold in the case that the current operation mode is the color mode.

According to an example, the machine-executable instructions may also cause the processor to:
determine whether to switch between operation modes according to the distance between the monitored target and the video surveillance device.

According to an example, when determining whether to switch between operation modes according to the distance between the monitored target and the video surveillance device, the machine-executable instructions may cause the processor to:
detect the distance between the monitored target and the video surveillance device through a motion detection or a PIR detection; and
determine that the current operation mode is to be switched to the color mode when the detected distance is within a particular range.

According to an example, when setting the target exposure value of the target operation mode to be switched to and calculating the exposure parameter of the target operation mode according to the target exposure value in combination with the exposure parameters of the current operation mode, the machine-executable instructions may cause the processor to: calculate the exposure parameter of the target operation mode according to the following formula:

$$G1 * S1 = \frac{G2 * S2 * R2 * P2 * K2 * T1}{R1 * P1 * K1 * T2}$$

where T2 is the exposure value of the current operation mode,
G2 is the gain of the current operation mode,
S2 is the shutter speed of the current operation mode,
R2 is the aperture of the current operation mode,
P2 is the power of the white light compensator in the current operation mode,
K2 is the transmittance of a light filter in the current operation mode,
T1 is the target exposure value of the target operation mode,
G1 is the gain of the target operation mode,
S1 is the shutter speed of the target operation mode,
R1 is the aperture of the target operation mode,
P1 is the power of the white light compensator in the target operation mode, and
K1 is the transmittance of the light filter in the target operation mode.

According to an example, the machine-executable instructions may also cause the processor to:
set the shutter speed S1 of the target operation mode to one in the frame rate of the video surveillance device, and adjust the gain of the video surveillance device according to the calculated gain G1 of the target operation mode.

The foregoing examples are merely illustrative of technical solutions of the present disclosure but not intended to limit the technical solutions of the present disclosure. Various corresponding modifications and variations may be devised by those skilled in the art according to the present disclosure without departing from the spirit and the essence of the present disclosure. However, such modifications and variations should fall within the scope of protection defined by appended claims.

The invention claimed is:

1. A method of switching between operation modes of a video surveillance device, comprising:
   reading a current operation mode of the video surveillance device and recording an exposure parameter of the current operation mode; and in case that a switch between operation modes is to be performed, setting a target exposure value of a target operation mode to be switched to, and calculating an exposure parameter of the target operation mode according to the target exposure value in combination with the exposure parameter of the current operation mode.

2. The method according to claim 1, wherein the operation modes comprise a black/white mode and a color mode.

3. The method according to claim 2, further comprising:
   determining whether the switch between the operation modes is to be performed according to the current operation mode and an amount of ambient illumination.

4. The method according to claim 3, wherein determining whether the switch between the operation modes is to be performed according to the current operation mode and the amount of ambient illumination comprises:
   in the case that the current operation mode is the black/white mode, determining that the current operation mode is to be switched to the color mode when the amount of ambient illumination is above a particular threshold; and in the case that the current operation mode is the color mode, determining that the current operation mode is to be switched to the black/white mode when the amount of ambient illumination is below a particular threshold.

5. The method according to claim 2, further comprising:
   determining whether the switch between the operation modes is to be performed according to a distance between a monitored target and the video surveillance device.

6. The method according to claim 5, wherein determining whether the switch between the operation modes is to be performed according to the distance between the monitored target and the video surveillance device comprises:
   detecting the distance between the monitored target and the video surveillance device through either of a motion detection and a Passive Infrared (PIR) detection; and determining that the current operation mode is to be switched to the color mode when the detected distance is within a particular range.

7. The method according to claim 1, wherein calculating the exposure parameter of the target operation mode according to the target exposure value in combination with the exposure parameter of the current operation mode, comprise:
   calculating the exposure parameter of the target operation mode according to the following formula:

$$G1*S1 = \frac{G2*S2*R2*P2*K2*T1}{R1*P1*K1*T2}$$

wherein
   T2 is an exposure value of the current operation mode,
   G2 is a gain of the current operation mode,
   S2 is a shutter speed of the current operation mode,
   R2 is an aperture of the current operation mode,
   P2 is power of a white light compensator in the current operation mode,
   K2 is a transmittance of a light filter in the current operation mode,
   T1 is the target exposure value of the target operation mode,
   G1 is a gain of the target operation mode,
   S1 is a shutter speed of the target operation mode,
   R1 is an aperture of the target operation mode,
   P1 is power of the white light compensator in the target operation mode, and
   K1 is a transmittance of the light filter in the target operation mode.

8. The method according to claim 7, further comprising:
   setting the shutter speed S1 of the target operation mode to one in a frame rate of the video surveillance device, and adjusting the gain of the video surveillance device according to the calculated gain G1 of the target operation mode.

9. The method according to claim 1, wherein the exposure parameter of the current operation mode comprises: a first exposure value, a first gain, a first shutter speed, a first aperture, a first power of a white light compensator and a first transmittance of a light filter of the current operation mode;
   wherein calculating the exposure parameter of the target operation mode according to the target exposure value in combination with the exposure parameter of the current operation mode comprises:
   calculating a product of a second gain and a second shutter speed of the target operation mode according to the target exposure value, a second aperture, a second power of the white light compensator and a second transmittance of the light filter of the target operation mode, the first exposure value, the first gain, the first shutter speed, the first aperture, the first power and the first transmittance in combination with a exposure equivalence principle.

10. The method according to claim 9, further comprising:
    determining the second gain according to the product and the second shutter speed.

11. A device for switching between operation modes of a video surveillance device, comprising:
    a processor; and a machine-readable storage medium which stores machine-executable instructions corresponding to a logic for switching between operation modes,
    wherein, by reading and executing the machine-executable instructions, the processor performs the following operation:
    reading a current operation mode of the video surveillance device, and recording an exposure parameter of the current operation mode; and in case that a switch between the operation modes is to be performed, setting a target exposure value of a target operation mode to be switched to, and calculating an exposure parameter of the target operation mode according to the target exposure value in combination with the exposure parameter of the current operation mode.

12. The device according to claim 11, wherein the operation modes comprise a black/white mode and a color mode.

13. The device according to claim 12, wherein the processor is further caused by the machine-executable instructions to:
    determine whether the switch between the operation modes is to be performed according to the current operation mode and an amount of ambient illumination.

14. The device according to claim 13, wherein when determining whether the switch between the operation modes is to be performed according to the current operation mode and the amount of ambient illumination, the processor is caused by the machine-executable instructions to:
    in the case that the current operation mode is the black/white mode, determine that the current operation mode is to be switched to the color mode when the amount of ambient illumination is above a particular threshold; and in the case that the current operation mode is the color mode, determine that the current operation mode is to be switched to the black/white mode when the amount of ambient illumination is below a particular threshold.

15. The device according to claim 12, wherein the processor is further caused by the machine-executable instructions to:
    determine whether the switch between the operation modes is to be performed according to a distance between a monitored target and the video surveillance device.

16. The device according to claim 15, wherein when determining whether the switch between the operation modes is to be performed according to the distance between the monitored target and the video surveillance device, the processor is caused by the machine-executable instructions to:
    detect the distance between the monitored target and the video surveillance device through either of a motion detection and a Passive Infrared (PIR) detection; and determine that the current operation mode is to be switched to the color mode when the detected distance is within a particular range.

17. The device according to claim 11, wherein calculating the exposure parameter of the target operation mode according to the target exposure value in combination with the exposure parameter of the current operation mode, the processor is caused by the machine-executable instructions to:
    calculate the exposure parameter of the target operation mode according to the following formula:

$$G1*S1 = \frac{G2*S2*R2*P2*K2*T1}{R1*P1*K1*T2}$$

wherein
   T2 is an exposure value of the current operation mode,
   G2 is a gain of the current operation mode,
   S2 is a shutter speed of the current operation mode,
   R2 is an aperture of the current operation mode,
   P2 is power of a white light compensator in the current operation mode,
   K2 is a transmittance of a light filter in the current operation mode,
   T1 is the target exposure value of the target operation mode,
   G1 is a gain of the target operation mode,
   S1 is a shutter speed of the target operation mode,
   R1 is an aperture of the target operation mode,
   P1 is power of the white light compensator in the target operation mode, and
   K1 is a transmittance of the light filter in the target operation mode.

18. The device according to claim 17, wherein the processor is further caused by the machine-executable instructions to:
    set the shutter speed S1 of the target operation mode to one in a frame rate of the video surveillance device, and adjust the gain of the video surveillance device according to the calculated gain G1 of the target operation mode.

19. The device according to claim 11, wherein the exposure parameter of the current operation mode comprises: a first exposure value, a first gain, a first shutter speed, a first aperture, a first power of a white light compensator and a first transmittance of a light filter of the current operation mode;
    wherein calculating the exposure parameter of the target operation mode according to the target exposure value in combination with the exposure parameter of the current operation mode, the processor is caused by the machine-executable instructions to:
        calculate a product of a second gain and a second shutter speed of the target operation mode according to the target exposure value, a second aperture, a second power of the white light compensator and a second transmittance of the light filter of the target operation mode, the first exposure value, the first gain, the first shutter speed, the first aperture, the first power and the first transmittance in combination with a exposure equivalence principle.

20. The device according to claim 19, wherein the processor is further caused by the machine-executable instructions to:
    determine the second gain according to the product and the second shutter speed.

* * * * *